United States Patent [19]

Tung et al.

[11] Patent Number: 4,798,883

[45] Date of Patent: Jan. 17, 1989

[54] MODIFIED POLYETHYLENE NAPHTHALATE

[75] Inventors: William C. T. Tung, Tallmadge; Merry E. Floyd, Akron, both of Ohio

[73] Assignee: The Goodyear Tire & Rubber Company, Akron, Ohio

[21] Appl. No.: 176,555

[22] Filed: Apr. 1, 1988

[51] Int. Cl.$^4$ ............................................. C08G 63/02
[52] U.S. Cl. .................................... 528/272; 528/300; 528/308; 528/354; 528/425; 525/437; 525/439
[58] Field of Search ............... 528/272, 300, 308, 354, 528/425; 525/437, 439

[56] References Cited

U.S. PATENT DOCUMENTS 4,122,073 10/1978 Georgoudis .......................... 525/127
4,215,032 7/1980 Kobayashi et al. .................. 525/437

Primary Examiner—John Kight
Assistant Examiner—Samuel A. Acquah
Attorney, Agent, or Firm—Alvin T. Rockhill

[57] ABSTRACT

Polyethylene naphthalate is a polyester resin that is highly useful in numerous applications. For instance, polyethylene naphthalate can be molded into a wide variety of products which have outstanding properties. However, polyethylene naphthalate does not crystallize rapidly at temperatures which are normally used in molding operations. This invention discloses a modified polyethylene naphthalate which crystallizes rapidly at much lower temperatures than does polyethylene naphthalate homopolymer. The modified polyethylene naphthalates of this invention contain a small amount of polyether glycol. This invention more specifically relates to a polyester comprised of repeat units which are derived from (a) a naphthalate dicarboxylic acid and (b) a diol component which is comprised of (1) at least one glycol containing from 2 to 12 carbon atoms and (2) from about 1 to about 12 weight percent of at least one polyether glycol based upon the total weight of the polymer.

19 Claims, No Drawings

MODIFIED POLYETHYLENE NAPHTHALATE

BACKGROUND OF THE INVENTION

Polyethylene naphthalate (PEN) has physical properties which makes it highly desirable for utilization in making a wide variety of articles. For instance, PEN can be molded into bottles for carbonated beverages which have outstanding gas barrier characteristics and heat stability. The outstanding gas barrier characteristics of PEN make it a viable candidate as a material for manufacturing bottles for beverages which are highly sensitive to oxygen, such as beer. Its high melting point also makes it suitable for use in manufacturing beverage bottles which can be recycled and sterilized at elevated temperatures. PEN also has an excellent combination of properties for utilization in making food trays which are suitable for use in either convection ovens or microwave ovens.

PEN does not crystallize rapidly at temperatures which are normally utilized in standard molding operations. In fact, PEN has a maximum crystallization rate at about 195° C. This very high crystallization peak temperature associated with PEN necessitates the utilization of high molding temperatures to achieve reasonable molding cycle times. Unfortunately, the utilization of such high molding temperatures results in equipment problems and higher costs. Molding PEN at standard molding temperatures is generally not a viable commercial option because the slow crystallization rates attained dictate the use of unacceptably long cycle times.

SUMMARY OF THE INVENTION

The present invention discloses a modified PEN which has a greatly improved crystallization rate at standard molding temperatures. This modified PEN has a maximum crystallization rate at about 160° C. which is about 35° lower than the temperature at which the maximum crystallization rate is realized in PEN homopolymer. The modified PEN of this invention can be molded into a wide variety of useful articles using standard molding equipment and conventional molding temperatures. For instance, the modified PEN of this invention can be thermoformed into "dual-ovenable" trays which can be used in either convection ovens or microwave ovens. It can also be molded into clear bottles for carbonated beverages utilizing standard molding techniques and standard equipment such as that which is utilized in making polyethylene terephthalate beverage bottles.

The modified PEN of this invention contains a small amount of at least one polyether glycol. This invention specifically discloses a polyester comprised of repeat units which are derived from (a) a naphthalene dicarboxylic acid and (b) a diol component which is comprised of (1) at least one glycol containing from 2 to 12 carbon atoms and (2) from about 1 to about 12 weight percent of at least one polyether glycol based upon the total weight of the polymer.

The subject invention more specifically reveals a modified polyethylene naphthalate having an improved crystallization rate which is comprised of repeat units which are derived from (a) a naphthalene dicarboxylic acid and (b) a diol compoeent which is comprised of (1) at least one glycol containing from 2 to 12 carbon atoms and (2) from about 1 to about 12 weight percent of at least one polyether glycol based upon the total weight of the polymer.

DETAILED DESCRIPTION OF THE INVENTION

The polyesters of this invention are prepared by reacting a naphthalene dicarboxylic acid with a diol component. The naphthalene dicarboxylic acid component will typically be 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid or 2,7-naphthalene dicarboxylic acid. In most cases, 2,6-naphthalene dicarboxylic acid will be utilized as the naphthalene dicarboxylic acid component. The term "naphthalene dicarboxylic acid" as used herein is also intended to include diesters of naphthalene dicarboxylic acids. Accordingly, diesters of 2,6-naphthalene dicarboxylic acid, such as dimethyl-2,6-naphthalate, will commonly be used as the naphthalene dicarboxylic acid component.

The diol component utilized in preparing the modified PEN of this invention is comprised of (1) at least one glycol containing from 2 to 12 carbon atoms and (2) at least one polyether glycol. The preferred glycols normally contain from 2 to 8 carbon atoms. Some representative examples of glycols that can be utilized in the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, and the like. In most cases ethylene glycol will be utilized as the glycol in the diol component.

The diol component utilized also contains from about 1 to about 12 weight percent of at least one polyether glycol based upon the total weight of the polymer. The polyether glycols which can be used have the structural formula:

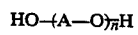

wherein A is an alkylene group containing from 2 to about 8 carbon atoms and wherein n is an integer from 2 to about 400. These polyether glycols typically have number average molecular weights which are within the range of about 500 to about 3,000. The polyether glycol will preferably have a number average molecular weight which is within the range of about 650 to about 2,000 and will most preferably have a number average molecular weight which is within the range of 800 to 1,700. It is also generally preferred for A to represent an alkylene group which contains from 2 to 6 carbon atoms, such as ethylene groups, propylene groups, butylene groups, pentylene groups and hexylene groups. It is normally most preferred for A to contain 4 carbon atoms. This highly preferred polyether glycol has the structural formula:

wherein n represents an integer from about 7 to about 40 and preferably where n represents an integer from 10 to 25. Some representative examples of commercially available polyether glycols that can be used include polytetramethylene glycol (Polymeg ™) and polyethylene glycol (Carbowax ™).

The diol component utilized in preparing the modified PEN of this invention will preferably contain from about 2 to about 10 weight percent polyether glycol based upon the total weight of the polymer. The diol component will most preferably contain 6 to 9 weight percent polyether glycols based upon the total weight of the polymer.

The modified PEN of this invention can be synthesized utilizing conventional polymerization techniques which are well known in the art. It is appropriate to prepare the modified PEN of this invention utilizing the same equipment and conditions as is utilized by persons skilled in the art in preparing PEN homopolymer, except, of course, it is necessary to include at least one polyether glycol in the diol component utilized. Thus, conventional temperatures, catalysts, amounts of catalysts, stabilizers and the like, are used in manners well known in the literature and art. For instance, a two step process can be utilized in preparing the modified PEN of this invention. In the first step, the dimethyl ester of naphthalene dicarboxylic acid and the diol component can be heated to a temperature which is within the range of about 150° C. to about 240° C. under an inert gas atmosphere, such as nitrogen or a Noble gas. For economic reasons, nitrogen will usually be utilized. This transesterification reaction can be carried out in the presence of appropriate catalysts, such as titanium alkoxides, tetraalkyltitanium compounds, zinc acetates, manganese acetates, and the like. In the second step, the polycondensation reaction can be carried out under a reduced pressure of less than about 0.5 mm of mercury (66.7 Pascals) at a temperature which is typically within the range of about 230° C. to about 300° C. The polymerization time required will vary with the amount and type of catalyst used as well as the polymerization temperature utilized. It will also depend somewhat upon the desired molecular weight of the modified PEN being synthesized.

The modified PEN of this invention typically has a number average molecular weight of at least about 10,000. The modified PEN of this invention preferably has a number average molecular weight which is within the range of about 12,000 to about 60,000. In most cases, it will be preferred for the modified PEN of this invention to have a number average molecular weight which is within the range of 15,000 to 30,000.

The modified PEN of this invention can be molded into a wide variety of useful articles. For instance, the modified PEN can be injection molded or thermoformed utilizing standard injection molding or thermoforming equipment. Antidegradants, colorants, fillers or other desired agents can be added to the modified PEN in order to attain the desired combination of properties.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

A glass polymerization reactor equipped with a stirrer and nitrogen inlet was charged with 40 grams of dimethyl-2,6-naphthalate and 40 cc of ethylene glycol. A transesterification reaction was catalyzed by the addition of 0.014 g of manganese acetate. The transesterification reaction was carried out at 180°–190° C. under nitrogen. After all of the methyl alcohol was distilled over, 3.5 g of Polymeg ™ 1000 (polytetramethylene glycol), 0.02 g of antimony trioxide and 0.4 g of a heat stabilizer (Naugard ™ 445) was added. The polymerization was carried out at a temperature of 275°–285° C. The modified PEN produced was determined to have an intrinsic viscosity of 0.594 dl/g. A quenched sample of the modified PEN produced was determined by differential scanning calorimetry to have a maximum crystallization rate at a temperature of 158° C. A Perkin-Elmer DSC was utilized in determining the maximum crystallization temperature with a heating rate of 10° C. per minute being employed.

This experiment shows that the modified PEN produced had a maximum crystallization rate at a moderate temperature. Accordingly, the modified PEN produced could be utilized in molding useful articles at moderate temperatures with good cycle time being realized. For these reasons, the modified PEN produced could be used in preparing molded crystalline articles quickly, easily and at reduced cost.

EXAMPLE 2

The procedure specified in Example 1 was repeated in this experiment except that the amount of polytetramethylene oxide utilized was increased to 4 g. The intrinsic viscosity of the modified PEN produced was determined to be 0.55 dl/g. It was also determined by differential scanning calorimetry to have a maximum crystallization rate at a temperature of 160° C.

EXAMPLE 3 (COMPARATIVE)

In this experiment PEN homopolymer was synthesized for purposes of comparison. The procedure specified in Example 1 was utilized in preparing the PEN homopolymer except that no polytetramethylene glycol was utilized in the polymerization recipe. The PEN homopolymer produced was determined to have an intrinsic viscosity of 0.52. It was also determined by differential scanning calorimetry to have a maximum crystallization rate at a temperature of 195° C.

This comparative example shows that the maximum crystallization rate of PEN homopolymers is about 35° C. higher than the modified PEN of this invention. Thus, the modified PEN of this invention can be molded utilizing lower mold temperatures with much faster crystallization rates being realized.

While certain representative embodiments have been shown for the purpose of illustrating the present invention, it will be apparent to those skilled in this art that various changes and modifications can be made therein without departing from the scope of the present invention.

What is claimed is:

1. A polyester consisting essentially of repeat units which are derived from (a) a naphthalene dicarboxylic acid and (b) a diol component which is comprised of (1) at least one glycol containing from 2 to 12 carbon atoms and (2) from about 1 to about 12 weight percent of at least one polyester glycol based upon the total weight of the polymer wherein said polyether glycol has the structural formula:

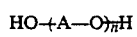

wherein A is an alkylene group containing from 2 to about 8 carbon atoms and wherein n is an integer from 2 to about 400.

2. A modified polyethylene naphthalate having an improved crystallization rate which consists essentially of repeated units which are derived from (a) a naphthalene dicarboxylic acid and (b) a diol component which is comprised of (1) ethylene glycol and (2) from about 1 to about 12 weight percent of at least one polyester glycol based upon the polymer wherein said polyester glycol has the structural formula:

wherein A is an alkylene group containing from 2 to about 8 carbon atoms and wherein n is an integer from 2 to about 400.

3. A polyester as specified in claim 1 wherein said naphathalene dicarboxylic acid is selected from the group consisting of 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, dimethyl-1,2-naphthalate, dimethyl-1,4-naphthalate, dimethyl-1,5-naphthalate, dimethyl-1,6-naphthalate, dimethyl-1,7-naphthalate, dimethyl-1,8-naphthalate, dimethyl-2,3-naphthalate, dimethyl-2,6-naphthalate and dimethyl-2,7-naphthalate.

4. A modified polyethylene naphthalate as specified in claim 2 wherein said naphthalene dicarboxylic acid is selected from the group consisting of 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, dimethyl-1,2-naphthalate, dimethyl-1,4-naphthalate, dimethyl-1,5-naphthalate, dimethyl-1,6-naphthalate, dimethyl-1,7-naphthalate, dimethyl-1,8-naphthalate, dimethyl-2,3-naphthalate, dimethyl-2,6-naphthalate and dimethyl-2,7-naphthalate.

5. A polyester as specified in claim 3 wherein the glycol contains from 2 to 8 carbon atoms.

6. A polyester as specified in claim 3 wherein said glycol is selected from the group consisting of ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol.

7. A polyester as specified in claim 5 wherein said naphthalene dicarboxylic acid is 1,6-naphthalene dicarboxylic acid.

8. A polyester as specified in claim 5 wherein said naphthalene dicarboxylic acid is dimethyl-1,6-naphthalate.

9. A polyester as specified in claim 5 wherein said naphthalene dicarboxylic acid is 2,6-naphthalene dicarboxylic acid.

10. A polyester as specified in claim 5 wherein said naphthalene dicarboxylic acid is dimethyl-2,6-naphthalate.

11. A polyester as specified in claim 3 wherein said polyether glycol has a number average molecular weight which is within the range of about 500 to about 3,000.

12. A polyester as specified in claim 5 wherein the diol component contains from about 2 weight percent to about 10 weight percent of said polyether glycol based upon the total weight of the polymer.

13. A polyester as specified in claim 5 wherein said polyether glycol as a number average molecular weight which is within the range of about 650 to about 2,000 and wherein the diol component contains from 6 weight percent to 9 weight percent of said polyether glycol based upon the total weight of the polymer.

14. A polyester as specified in claim 13 wherein said polyester has a number average molecular weight which is within the range of about 12,000 to about 60,000.

15. A modified polyethylene naphthalate as specified in claim 4 wherein the polyether glycol has a number average molecular weight which is within the range of about 500 to about 3,000.

16. A modified polyethylene naphthalate as specified in claim 15 wherein the diol component contains from about 2 to about 10 weight percent of said polyether glycol based upon the total weight of the polymer.

17. A modified polyethylene naphthalate as specified in claim 16 wherein said polyether glycol has the structural formula:

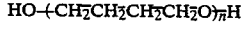

wherein n is an integer from about 7 to about 40.

18. A modified polyethylene naphthalate as specified in claim 17 wherein n is an integer from 10 to 25.

19. A modified polyethylene naphthalate as specified in claim 18 wherein the naphthalene dicarboxylic acid is selected from the group consisting of 2,6-naphthalene dicarboxylic acid and dimethyl-2,6-naphthalate; wherein the modified polyethylene naphthalate has a number average molecular weight which is within the range of 15,000 to 30,000; and wherein the diol component contains from 6 weight percent to 9 weight percent of said polyether glycol based upon the total weight of the polymer.

* * * * *